United States Patent [19]

Lazzari

[11] 4,314,297
[45] Feb. 2, 1982

[54] PROCESS FOR GENERATING A MAGNETIC INDUCTION FIELD WITHIN A MAGNETIC MEDIUM

[75] Inventor: Jean-Pierre Lazzari, Montfort l'Amaury, France

[73] Assignee: Compagnie Internationale pour l'Informatique CII-Honeywell Bull (Societe Anonyme), Paris, France

[21] Appl. No.: 104,859

[22] Filed: Dec. 18, 1979

[30] Foreign Application Priority Data

Apr. 6, 1979 [FR] France .............................. 79 08713

[51] Int. Cl.³ .............................................. G11B 5/12
[52] U.S. Cl. ..................................... 360/113; 360/115
[58] Field of Search ................ 360/113, 115, 120–123, 360/125, 55; 338/32 R; 324/252

[56] References Cited

U.S. PATENT DOCUMENTS

| | | | |
|---|---|---|---|
| 3,671,681 | 6/1972 | Stauffer | 360/113 |
| 3,723,665 | 3/1973 | Lazzari et al. | 360/123 |
| 3,846,841 | 11/1974 | Lazzari et al. | 360/121 |
| 4,138,702 | 2/1979 | Magnenet | 360/121 X |

OTHER PUBLICATIONS

IBM/TDB, vol. 12, No. 8, Jan. 1970, p. 1304, "Magnetic Recording . . . ", by Wellbrock.
IBM/TDB, vol. 12, No. 2, Jul. 1978, pp. 667–668, "Magnetic Read/Write Thin Film Head . . . ", by Brunsch et al.
IEEE Proceedings, Sep. 1966, pp. 1216–1217, "A Magnetostrictive Device for Use in Scanning", By Chin.
IBM/TDB, vol. 17, No. 11, Apr. 1975, pp. 3498–3500, "Six Acoustic Transducers for . . . ", by Bajorek et al.

Primary Examiner—John H. Wolff
Attorney, Agent, or Firm—Kerkam, Stowell, Kondracki & Clarke

[57] ABSTRACT

A process for generating a magnetic induction field within a magnetic medium. A magnetic excitation field and a selection wave are caused to act simultaneously at each point on a path of at least one non-saturated portion of the magnetic medium, in such manner as to modify the magnetic properties of the medium at this point by degrading them and thus producing therein the induction field. The process is applicable to devices for generating a magnetic field utilized in magnetic data recording systems, wherein the magnetic medium is of a "degraded type".

13 Claims, 16 Drawing Figures

PROCESS FOR GENERATING A MAGNETIC INDUCTION FIELD WITHIN A MAGNETIC MEDIUM

BACKGROUND OF THE INVENTION

Related Applications

The application relates to and is an improvement on the invention described in my co-pending application Ser. No. 104,851 filed Dec. 18, 1979, and entitled "Process For Generating A Magnetic Induction Field Within A Magnetic Medium". The subject matter of said application is hereby incorporated by reference.

BRIEF DESCRIPTION OF THE RELATED APPLICATION

The process described in the aforenoted application for patent consists in creating in a non-saturated part of the magnetic medium a magnetic excitation field HE, and a selection wave OS which is propagated along at least one given path of this medium, starting from a given reference or datum point and from a reference moment $t_R$ while modifying, over an area $D_i$ surrounding each point $M_i$ of the said path, the magnetic properties of this area at the instant $t_i$ in which the wave reaches this point. The excitation field HE and the selection wave OS act simultaneously at instant $t_i$ to thus produce the induction field in the magnetic medium.

Preferably the selection wave OS is an acoustic wave and the magnetic medium is magnetostrictive. The acoustic wave OS creates on the area $D_i$ at time $t_i$, a mechanical stress which in turn produces a magnetic selection field HS.

Thus the simultaneous action of the excitation field HE and the selection wave OS on the area $D_i$ at time $t_i$ is equivalent to the simultaneous action of a magnetic excitation field HE and a magnetic selection field HS.

The transducer device for generating a magnetic induction field utilizing the process described in the aforenoted application for patent comprises means for generating the selection wave OS connected to the said datum point, means for generating the excitation field HE at least in part along the said path, and means to eliminate any reflection of the selection wave on the said path.

The recording system for carrying out the process and which incorporates the aforenoted transducer device, comprises first control means for controlling the means for generating the selection wave OS, second control means for controlling the means for generating the excitation field HE, and a recording carrier situated closely adjacent to and facing the magnetic medium in such a manner that the recording is carried out in a direction parallel to the given path.

In my aforenoted application for patent, the magnetostrictive medium which is used and described is such that, if it is submitted to greater stresses produced by the acoustic selection wave, an improvement in its magnetic properties is obtained, translating into the obtention of higher and higher induction fields. This improvement occurs on the one hand to increase the magnetic permeability of the material which is equal to the relationship B/H, between the induction B and the magnetic field H in this medium, and on the other hand to obtain an enlargement of the hysteresis cycle, that is to say to obtain minor cycles approaching more more closely the major hysteresis cycle of the said medium. Such a magnetostrictive medium is defined as being an "improved type".

There are magnetostrictive mediums such that if they are submitted to ever greater stresses produced, for example, by an acoustic wave, a degradation of their magnetic properties is obtained which is translated into the obtention of ever weaker magnetic induction fields by the diminution of their magnetic permeability and by the contraction of their hysteresis cycle, that is to say by obtaining minor cycles approaching more and more closely to the minor limit cycle for which the induction D and the magnetic field H are nil. Such a magnetostrictive medium is defined as being of a "degraded type".

SUMMARY OF THE INVENTION

The present invention consists in utilizing such magnetostrictive mediums, i.e. mediums of a "degraded type" in a process, device and system of recording of the type described in my aforenoted application for patent.

According to the present invention, the process for generating a magnetic induction field in a magnetic medium consists in creating in a non-saturated part of this medium a magnetic excitation field and a selection wave which is propagated along at least one given path of the non-saturated part starting from a given datum point and from a reference instant $t_R$, while modifying over an area surrounding each point of the said path, the magnetic properties of this area at the instant $t_i$ when the wave reaches this point. The selection wave and the excitation field act simultaneously at the instant $t_i$ on the said area so as to produce therein the said induction field. The selection wave modifies the magnetic properties of the said area by degrading them; i.e. by causing a contraction of the hysteresis cycle and a decrease in the magnetic permeability.

Preferably the selection wave is an acoustic wave and the magnetic medium is magnetostrictive of the "degraded type".

BRIEF DESCRIPTION OF THE DRAWINGS

The characteristics and advantages of the present invention will be seen more clearly from the text which follows with reference to the accompanying drawings.

In these drawings:

FIG. 4 shows a preferred embodiment of the magnetic field generation device utilizing the process according to the present invention and includes two parts.

FIG. 5 shows the magnetic circuit of the magnetic field generation device shown in FIG. 4 with regard to the magnetic recording device of the data recording system shown in FIG. 3, a non-saturated part of the circuit being magnetostrictive and of the "degraded type", and includes three parts.

FIG. 6 showns a preferred method of propagation of the stress within the magnetostrictive portion of the "degraded type" of the magnetic circuit of the generation device according to the present invention and comprises FIGS. 6a, 6b and 6c illustrating graphs of the propagation of a strain and FIG. 6d which illustrates propagation of the stress along a magnetic cylinder.

DESCRIPTION OF THE PREFERRED EMBODIMENT

Figure 1:
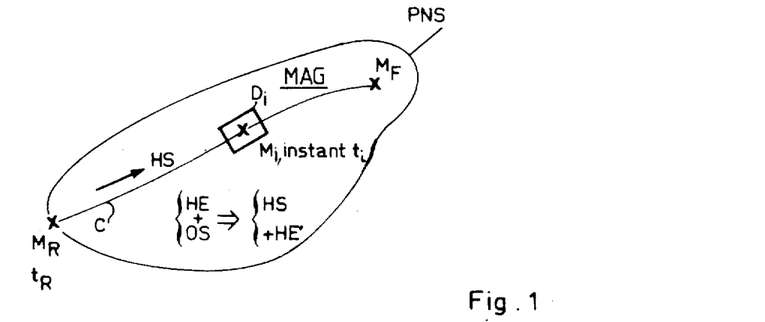
FIG. 1 illustrates the principle of the process for generating a magnetic induction field in a magnetic medium.

Referring to FIG. 1, PNS represents a non-saturated portion of a magnetic medium MAG of any shape and a track C located within it or on its surface.

For simplification this track is taken as continuous and finite. Its origin, called "reference or datum point", is the point $M_R$ and its end is the point $M_f$. To simplify the reasoning, the initial magnetic state of the set of points of the track C is defined by the minor hystersis cycle $CHMIN_O$ shown in FIG. 2a and 2c.

Figure 2A:
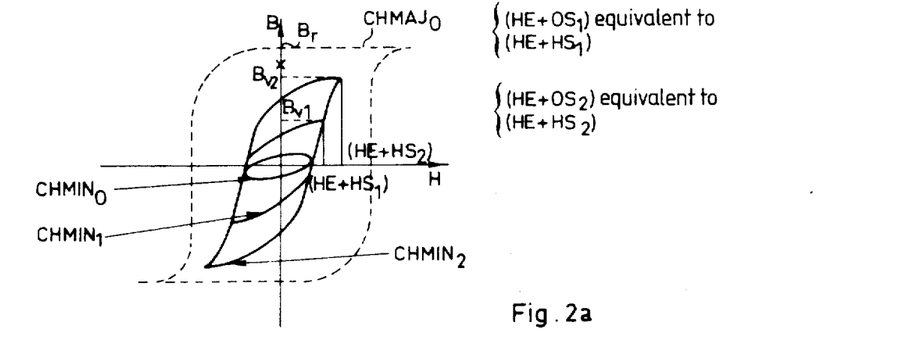
FIG. 2a shows how a magnetic induction field is produced in a non-saturated part of a magnetic medium, the magnetic properties of which improve when it is submitted to a selection wave.

According to the process for generating a magnetic induction field described in my aforenoted application for patent, in the non-saturated part PNS of the medium MAG are created a magnetic excitation field HE and a selection wave OS which is propogated from the reference point $M_R$ and at a reference instant $t_R$ along the track C at a propagation speed V. On reaching point $M_i$ on this track at the instant $t_i$, the selection wave modifies the magnetic properties of an elementary magnetic area $D_i$ surrounding this point. For simplification the elementary area $D_i$ is represented by a rectangle in FIG. 1. The excitation field HE and the wave OS, act simultaneously at this moment to produce the desired induction field $B_v$ as indicated in FIGS. 2a and 2c. It can be said that the result of the action of the wave $O_s$ on the area $D_i$ is equivalent to that of a magnetic field HS applied at this point. In other words it can be said that to submit the point $M_i$ at the moment $t_i$ to the simultaneous action of the excitation field HE and the wave OS is equivalent to submitting this same point to the simultaneous action of the field HE and a magnetic selection field HS. In a preferred embodiment of the process the medium MAG is magnetostrictive and the selection wave OS is an acoustic wave which is propagated along the track C and at any point $M_i$ from the latter and creates a mechanical stress (traction or compression) whose action on this point is equivalent to that of the magnetic selection field HS.

Assuming that the magnetostrictive medium MAG is of the "improved type", as described in my aforenoted application for patent, the desired induction field $B_v$ is obtained in the following manner (FIG. 2a):

Consider a first acoustic selection wave $OS_1$ propagating along the track C at a speed V producing, at any point $M_i$ of the latter, a stress $\sigma_1$, producing a first magnetic selection field $HS_1$. When the first field reaches the the point $M_i$ at the instant $t_i$, the area $D_i$ surrounding this point is submitted to the total excitation field at HE and the selection field $HS_i$. The magnetic state of the area $D_i$ is then defined by the minor hysteresis cycle $CHMIN_1$. The magnetic induction field obtained is $B_{v1}$.

Consider a second acoustic selection wave $OS_2$ propagating along the tract C at the same speed V, producing at any point $M_i$ of the latter a stress $\sigma_2$ greater than $\sigma_1$, producing a second magnetic selection field $HS_2$ greater than $HD_1$.

When this second field reaches the point $M_i$, at the instant $t_i$, the area $D_i$ is submitted to the sum of the excitation field HE and of the second selection field $HS_2$. The magnetic state of the area $D_i$ is then defined by the minor hysteresis cycle $CHMIN_2$. The magnetic induction field obtained $B_{v2}$ is greater than $B_{v1}$.

It is also noted that if $\lambda$ is the distance measured along the track C, separating the point $M_R$ and $M_i$ the equation $$\lambda = |\vec{V}| \times t_i$$

is obtained.

FIG. 2a also shows in broken lines the major hysteresis cycle $CHMAJ_0$ of the magnetic medium MAG which defines a residual induction $B_r$. It is clearly seen from FIG. 2a that, in a non-saturated part of a magnetic magnetostrictive medium of the "improved type" there can be produced according to the process of the invention at precisely determined instants due to the simultaneous action of the field HE and the selection field HS propagating at speed V, a magnetic induction field $B_V$ which can have infinite values between O and $B_r$ at the point on any track C, the value of $B_v$ being the higher the greater the stress.

Figure 2B:
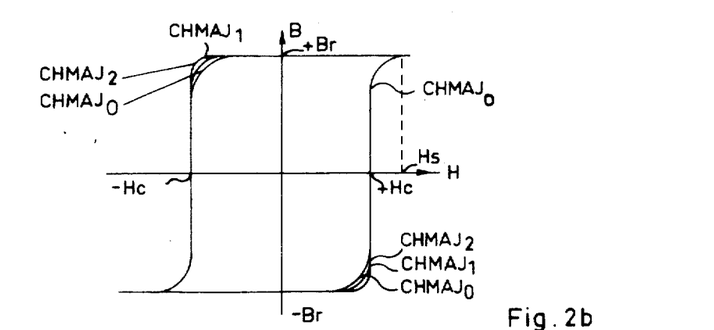
FIG. 2b shows that the process can only be applied to such a medium when it is magnetically saturated.
Figure 2C:
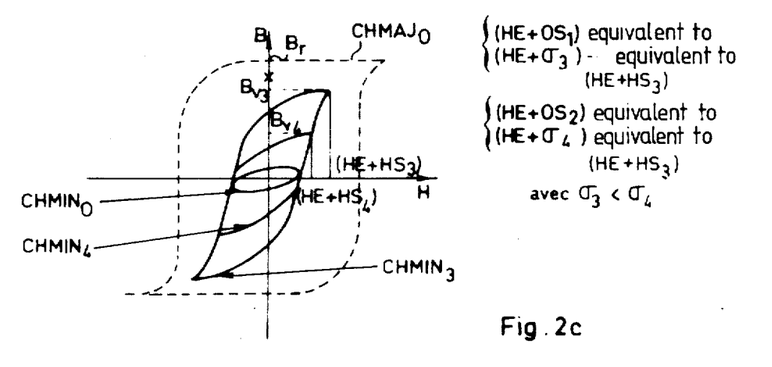
FIG. 2c shows how a magnetic induction field is produced according to the present invention in a non-saturated part of a magnetic medium whose magnetic properties are degraded when it is submitted to a selection wave.

FIG. 2b shows that this result cannot be obtained in the same magnetic medium if it is saturated.

In effect, the initial magnetic state (instant $t_i$) at any point $M_i$ of the track C is defined by the major hysteresis cycle $CHMAJ_0$, i.e. that the excitation field HE is equal to the magnetic saturation field $H_s$. The fact of submitting this point to a magnetic selection field $HS_1$ defines for it a new magnetic state corresponding to the major hysteresis cycle $CHMAJ_1$. It is then seen that this new magnetic state is practically identical to the initial magnetic state of the said point. Similarly, if this point is submitted to the field $HS_2$ greater than $HS_1$, its new magnetic state will be defined by the hysteresis cycle $CHMAJ_2$ practically identical to its initial magnetic state.

The present invention is concerned with the use of a magnetostrictive magnetic medium of the "degraded type". The desired induction field $B_v$ is obtained in the manner indicated in FIG. 2c. To this end, consider a third acoustic selection wave $OS_2$ producing at any point $M_i$ on the track C, at an instant $t_i$, a stress $\sigma_3$ producing a third magnetic selection field $HS_3$. To simplify the reasoning it is assumed that the propagation speed is the same as before, i.e. is V. When the field $HS_3$ reaches the point $M_i$ at the instant $t_i$, this point is submitted to the magnetic field $(HE + HS_3)$. The magnetic state is then defined by the minor hysteresis cycle $CHMIN_3$. The desired induction field is then equal to $B_{v3}$ and the magnetic permeability is obtained is equal to $\mu_3$.

Consider a fourth acoustic selection wave $OS_4$ propagating along C at a speed V, producing a stress $\sigma_4$ greater than $\sigma_3$. It produces a magnetic selection field $HS_4$ less than $HS_3$. When the field $HS_4$ reaches the point $M_i$ at the instant $t_i$ the area $D_j$ is submitted to the field $(HE+HS_4)$ and its magnetic field is defined by the minor hysteresis cycle $CHMIN_4$. The desired induction field is then equal to $B_{i4}$ which is less than $B_{i3}$, the permeability obtained being equal to $\mu_4$ less than $\mu_3$.

Figure 2D:
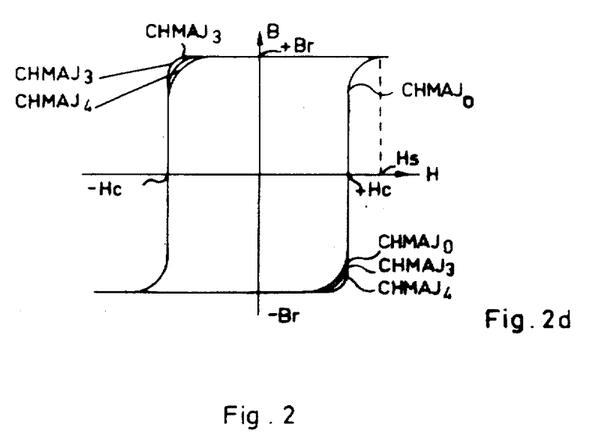
FIG. 2d shows that the process according to the present invention can only be applied to such a medium when it is magnetically saturated.

When the magnetostrictive medium MAG of the "degraded type" is saturated, it is seen from considering FIG. 2d that the magnetic induction field remains practically constant whatever the stress applied at any point of the track C. In effect, the fact of submitting this point to a stress $\sigma_3$ or to a stress $\sigma_4$ changes it from a magnetic state defined by the major cycle $CHMAG_3$ to a state defined by a major cycle $CHMAJ_4$ which is practically identical to the preceding one.

Figure 3:
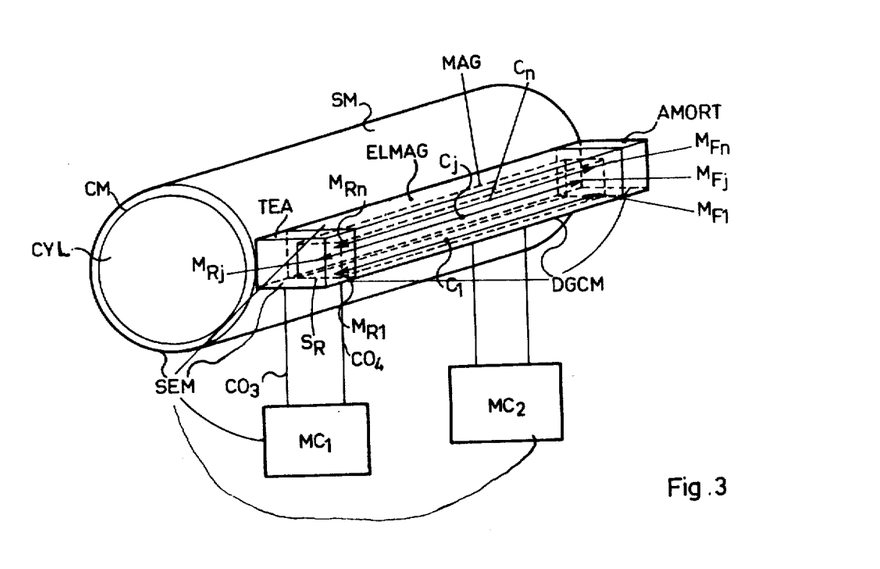
FIG. 3 is a general diagram showing a magnetic data recording system including a device for generating a magnetic field utilizing the process for generating a magnetic induction field according to the present invention.

FIG. 3 illustrates a data recording system SEM which includes a device for generating the magnetic field utilizing the process according to the present addition. The SEM system comprises a magnetic recording carrier SM, and a transducer device DGCM for generating the magnetic field. Device DGCM includes the magnetic medium MAG, acoustic generating means TEA for generating an acoustic selection wave OS, generating means ELMAG for generating the excitation field HE including the medium MAG, means AMORT for damping out any parasite reflection of the selection wave OS on all the paths of the medium MAG, control means $MC_1$ for control of the means TEA for generating the acoustic wave OS, and control means $MC_2$ for control of the means ELMAG for generating the excitation field.

The magnetic recording carrier SM shown in FIG. 3 is a drum, but it is obvious any other type of recording support, for example magnetic tape, could be used. The drum is formed by a solid or hollow cylinder CYL, the surface of which is covered by a layer of magnetic material CM. The latter has a relatively high coercive field between 100 and 500 oersteds. Its hysteresis cycle is practically rectangular.

The means TEA for generation of an acoustic selection wave OS are mechanically connected to the magnetostrictive magnetic medium MAG so that the stress spreads in this medium in a direction x' x parallel to the generatrices of the drum (also said to be parallel to the width[1] of the drum), the stress $\sigma$ producing the magnetic induction field HS in the non-saturated part PNS of the medium MAG. These means are constituted by an electro-acoustic transducer. This is connected to the control means $MC_1$ by means of the electric conductors $CO_3$ and $CO_4$ (see also FIG. 4). The material preferably used to constitute the transducer TEA is lithium niobate, whose electro-acoustic efficiency is of the order of 100 times greater than that of other crystals such as quartz (the electro-acoustic efficiency supplied to the transducers and the acoustic energy delivered by the said crystal). Its thickness e is of the order of 50 microns and its resonance frequency of the order of 20 megahertz.

The means ELMAG for generation of the excitation field HE are such that the magnetic medium MAG which they include comprises a plurality of magnetic tracks $C_1, C_2, \ldots C_j, \ldots C_n$ parallel to the generatrices of the drum and situated in its non-saturated part PNS. The reference points $M_{R1}, \ldots M_{Rj}, \ldots M_{rn}$ each of these paths are connected to the acoustic wave OS generation means TEA, all of these points forming the reference circuit $S_R$. The end points $M_{F1}$ to $M_{Fn}$ of these paths are connected to the means AMORT.

Figure 4A:
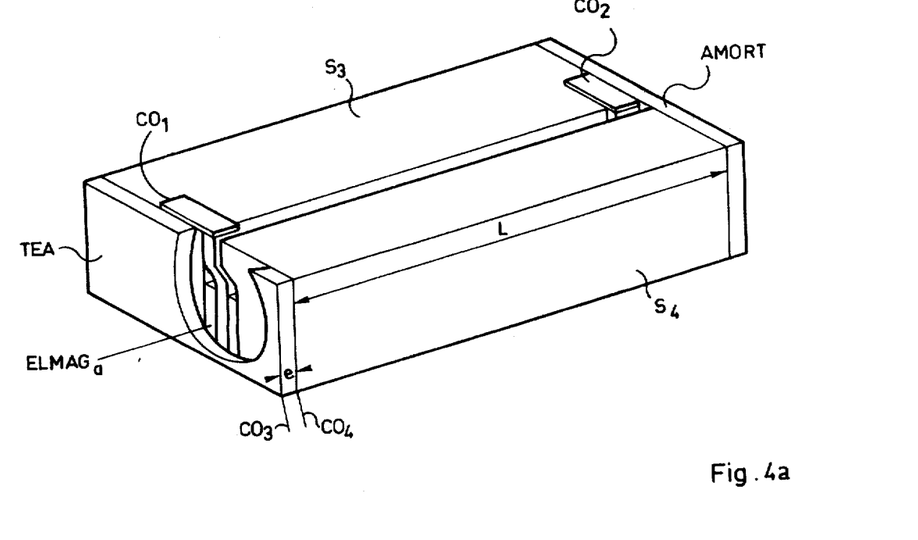
FIG. 4a which is a three quarter perspective view.
Figure 4B:
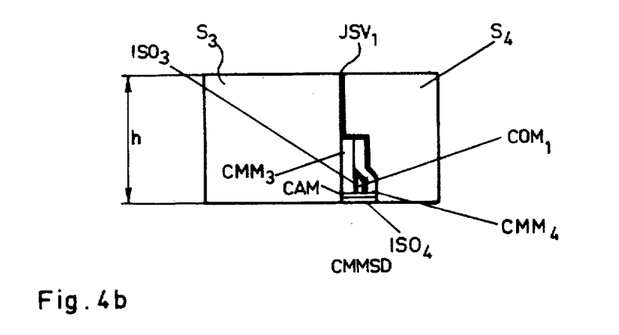
FIG. 4b is a view in cross-section.
Figure 5A:
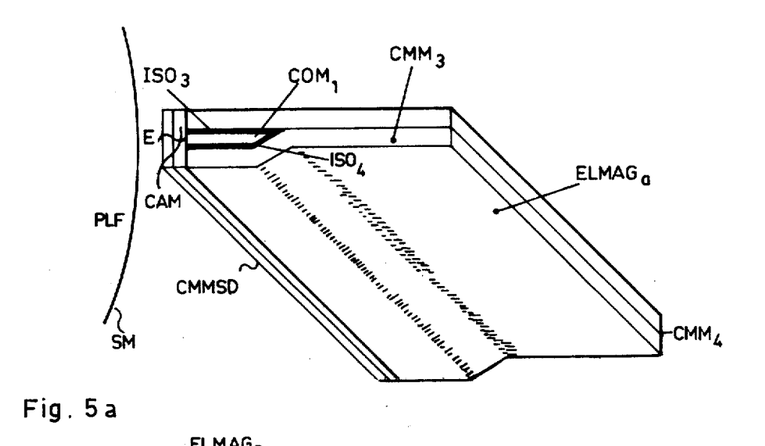
FIG. 5a which is a three quarter perspective view, and FIGS. 5b and 5c which are cross-sectional views showing the operation of the generation device according to the present addition.
Figure 5B:
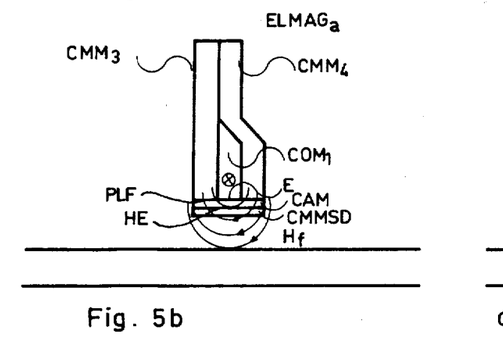

According to the present invention the means ELMAG for generating the excitation field HE are shown in more detail in FIGS. 4b, 5a and 5b. They are constituted by an electromagnet manufactured according to the method of manufacture of integrated magnetic transducers described, for example, in U.S. Pat. No. 3,723,665. A multiple head magnetic device is shown in U.S. Pat. No. 3,846,841. The electromagnet will hence forth be designated by $ELMAG_a$ and comprises a first thin magnetic layer $CMM_3$, a second thin magnetic layer $CMM_4$ coupled magnetically to the first, a thin layer conductor $COM_1$ positioned between the thin magnetic layers $CMM_3$ and $CMM_4$ and separated from them by first and second insulating layers $ISO_3$ and $ISO_4$, an electrically insulating magnetic layer CAM, and a magnetostrictive magnetic layer CMMSD of the "degraded type".

The layers $CMM_3$ and $CMM_4$ which form the pole pieces of the electromagnet $ELMAG_a$ are not magnetostrictive and can, for example, be constituted by an iron/nickel alloy of 80% iron and 20% nichel (a non-magnetostrictive material is also called "zero magnetostrictive").

The layer $CMM_3$ and $CMM_4$ and conductor $COM_1$ form an airgap E.

It is apparent to those skilled in the art that the single conductor $COM_1$ can be replaced by a plurality of conductors in thin layers separated from each other by insulating layers.

The amagnetic layer CAM is deposited on the front plane PLF of the unit formed by the layers $CMM_3$, $CMM_4$ and the conductor $COM_1$. Its aim is to regenerate the state of the surface of the said front plane which is obtained by mechanical means (by polishing and rectification for example) and which, in microscopic scale, therefore has numerous faults. This layer is formed of insulating material such as aluminium oxide $Al_2O_3$ or the silicon oxides $SiO_1$ and $SiO_2$.

The magnetic layer CMMSD is a layer with high permeability.

If the medium MAG is considered as being formed of layers $CMM_3$ and $CMM_4$ and the "degraded-type" magnetostrictive layer CMMSD, its non-saturated part PNS is formed by the layer CMMSD.

It is seen that the two layers $CMM_3$ and $CMM_4$ which form the polar pieces of the electromagnetic $ELMAG_a$ are not magnetostrictive as opposed to the layers $CMM_1$ and $CMM_2$ of the electromagnet ELMAG described in my aforenoted application for patent. In the present invention, the electromagnet $ELMAG_a$ further comprises the "degraded-type" magnetostrictive layer CMMSD which acts as a magnetic shunt.

As can be seen from FIG. 4b, the electromagnet $ELMAG_a$ is embedded in an assembly composed of two substrates $S_3$ and $S_4$ connected to each other by a glass welding joint $JSV_1$, the connection between $S_3$ and $S_4$ being effected according to the known methods of manufacture such as described for example in French Pat. No. 2.315.139. The two substates $S_3$ and $S_4$ are of the same type made, for example, of a material such as quartz or arsenic-sulphide based glass. The combination of the two substrates $S_3$ and $S_4$ is welded in an appropriate manner on the one hand to the electroacoustic transducer TEA and, on the other hand to the damping means AMORT, which are formed by a plastics material having a very high damping coefficient.

It is useful to note that the material forming the substrates $S_3$ and $S_4$ should be such that the speed of propagation of the acoustic wave in this material is practically identical to that of this same wave in the magnetic medium MAG. This propagation speed V is of the order of 400 meters per second for quartz and 1000 meters per second for glass based on arsenic sulphide.

The conductor $COM_1$ of the electromagnet $ELMAG_a$ is connected to an input conductor $CO_1$ and an output conductor $CO_2$, these two conductors being shown in FIG. 4a positioned on the upper part of the substrate $S_3$.

When the layer CMMSD is not subjected to any stress and the conductor $COM_1$ is traversed by a current I, the magnetic field created by this current in the magnetic circuit constituted by the pole pieces $CMM_3$ and $CMM_4$ and the layer CMMSD circulates in the latter in the manner indicated in FIG. 5b which shows a cross-section of the electromagnet $ELMAG_a$ supposedly situated at a distance $x_i$ from the reference surface $S_R$. It is seen that the magnetic field is then channelled to a large extent by the layer CMMSD because of the its very high permeability $\mu_{init}$, this layer then behaving like a magnetic shunt. The magnetic field in this layer is equal to HE. The leakage field created by $ELMAG_a$ designated by $H_{fI}$ has an insufficient strength to saturate the magnetic layer CM of the magnetic acoustic recording support SM.

Figure 5C:
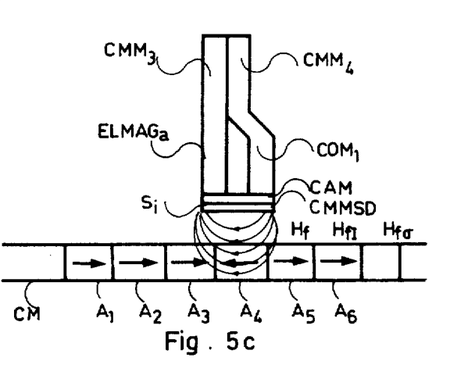

When the acoustic selection wave OS engendered by the transducer TEA traverses the layer CMMSD (the conductor $COM_1$ being constantly traversed by the current I), it creates at the moment $t_i$ when it reaches the cross-section shown in FIGS. 5b and 5c a stress $\sigma$ in this section which is designated as $S_i$. It is taken that the stress $\sigma$ in this section is uniform. The permeability of the surface $S_i$ of the layer CMMSD diminishes rapidly under the effect of the stress $\sigma$. If $\mu\sigma$ is the permeability obtained such that $\mu\sigma$ is less than $\mu_{init}$, the field created by the current I in the said magnetic circuit is no longer practically channeled by the layer CMMSD. The leakage field $H_f$ created by the electromagnet $ELMAG_a$ at the level of the surface $S_i$ has an intensity which is sufficient to saturate the field CM. Thus $H_f = H_{fI} + H_{f\sigma}$, where $H_{f\sigma}$ is the leakage field due to the stress.

The electromagnet $ELMAG_a$ can only be associated with a magnetic recording layer of the longitudinal type. FIG. 5c shows a section of elementary magnets $A_1$, $A_2$, $A_3$, $A_4$, $A_5$, $A_6$ where the direction of magnetic induction is indicated by an arrow. The magnetic induction in the magnet $A_4$ is in the opposite direction to the magnetic induction in magnets $A_1$, $A_2$, $A_3$, $A_4$, $A_5$, $A_6$.

Figures 6, 6D:
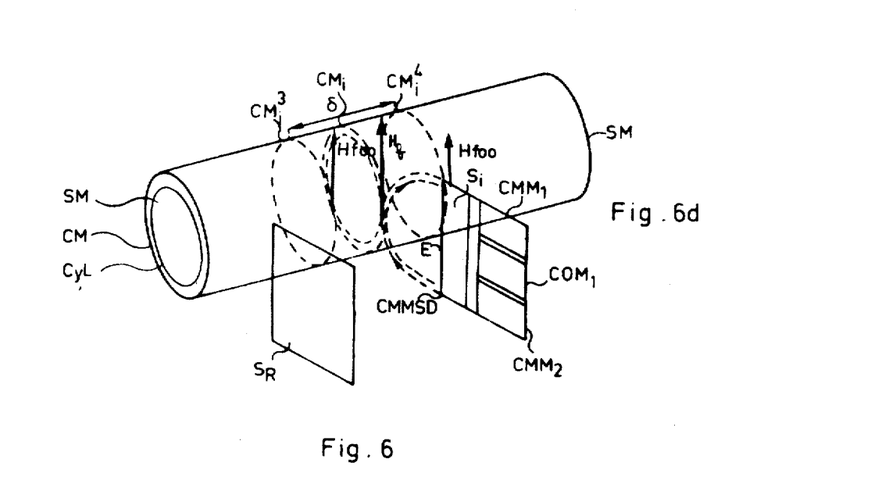

Reference will now be made to FIG. 6 which shows a preferred method of propagation of the stress in the magnetic medium MAG.

Figure 6A:
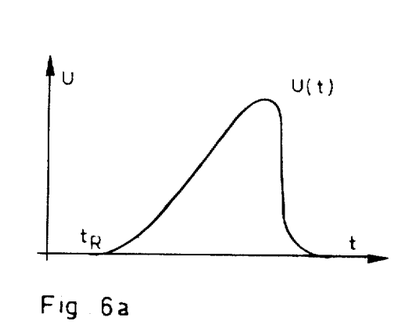

At reference instant $t_r$, a current pulse U(t) shown in FIG. 6a is transmitted to the electro-acoustic transducer TEA by means of conductors $CO_3$ and $CO_4$. The transducer TEA then produces an acoustic signal OS which gives rise to a stress propagating in the magnetic medium MAG as well as in the substrates $S_3$ and $S_4$ at a speed V. Only the non-saturated part PNS of the said medium constituted by the layer CMMSD is considered and the surface $S_i$ (FIGS. 6d, 5a and 5b) is referred to which is, therefore, constituted by all the points $M_{ij}$ of tracks $C_1, \ldots C_j, \ldots, C_n$ of the layer CMMSD situated at a distance $x_i$ from the reference surface $S_R$. The reasoning which follows is valid over the entire surface $S_i$, the stress $\sigma$ being supposedly uniform over all.

Figure 6B:
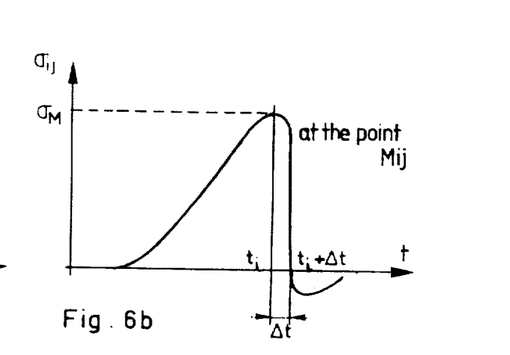

At any point $M_{ij}$ of any track $C_j$ of the surface $S_i$, the stress $\sigma_{ij}$ varies as a function of the time as is indicated in FIG. 6b, the stress attaining its maximum value $\sigma_m$ at the instant $t_i$. The distribution of the stress $\sigma$ as a function of the abscissa x measured along the track $C_j$ from the reference point $M_{Rj}$ is that indicated in FIG. 6c.

For a given value of the intensity of the excitation field HE there exists a stress value $\sigma_{OO}$ creating at any point on the surface $S_i$, selection field $HS_{OO}$ which, superposed on the field HE, permits obtention for the layer CMMSD of a permeability $\mu_{OO}$ such that the corresponding leakage field $H_{fOO}$ produced by the electromagnet $ELMAG_a$ in the plane of this surface and applied to the magnetic support SM permits saturation of the section $CM_i$ of the magnetic layer CM situated in this plane (see FIG. 6d).

Figure 6C:
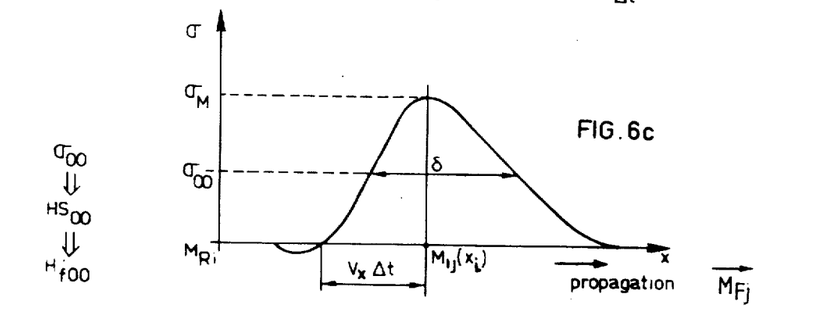

It is clearly seen from FIG. 6c that there is a part of the track $C_j$ of width $\sigma$ around the point $M_{ij}$ where the stress is greater than $\sigma_{OO}$, that is to say when the permeability obtained for the layer CMMSD is less than $\mu_{OO}$. The result is that the leakage field $H_f$ created by the electromagnet in $ELMAG_a$ is greater than $H_{fOO}$ which permits saturation of the support SM over a width close to $\sigma$ between sections $CM^3_i$ and $CM^3_i$ where $H_f = H_{fOO}$ (see FIG. 6d).

Generally the distance $\sigma$ is very much greater than the length of the elementary magnets (of domains) which it is usually attempted to obtain in the magnetic recording.

If it is desired to record on the support elementary magnets of dimensions less than $\sigma$, the excitation field HE and the selection field HS created by the stress $\sigma$ which, during the descending part of the latter that is to say between instants $t_i$ and $(t_i + \Delta t)$ (see FIG. 6b) are not superimposed. In this case the data is recorded on the magnetic support SM in a manner strictly identical to that described in the main patent with reference to FIGS. 7 and 8 of the latter. It is sufficient to refer to the text of the main patent replacing the terms ELMAG by $ELMAG_a$, $H_{fO}$ by $H_{fOO}$ and COM by $COM_1$. It could also be shown that the length of the domains recorded could be varied by varying the duration of passage of the current in the conductor $COM_1$.

The second method of stress propagation, illustrated in FIG. 9 of my aforenoted application for patent Ser. No. 104,851, can also be used in the device DGCM according to the present invention if one uses the electro-acoustic transducer at its maximum efficiency.

The control means $MC_1$ and $MC_2$ of the said device DGCM according to the present addition are identical to those described and shown in FIG. 11 of my aforenoted application for patent Ser. No. 104,851.

In order to determine the step $2\Delta x$ between two points recorded on the support SM and the width of the point $L_p$ reference is made to the text of the aforenoted patent application illustrated by FIGS. $10_a$ and $10_b$.

I claim:

1. A process for generating a magnetic induction field within a magnetic medium of a degraded type having a magnetically unsaturated portion comprising producing within the unsaturated portion a magnetic energizing field, generating a selection wave and propagating said wave along at least one given path of said medium, starting from a given datum point and from a reference instant $t_R$, and reaching each point of the said path at an instant the selection wave and the energizing field acting simultaneously at the instant $t_i$ on an area surrounding each point of said path cause the magnetic properties of said area to be modified and the said induction field to be generated.

2. A process according to claim 1, wherein the magnetic medium is of the magnetostrictive type, and the selection wave creates in the said area, at the instant $t_i$, a mechanical stress which for its part produces a magnetic selection field.

3. A process according to claims 1 or 2, wherein the selection wave is a sound wave.

4. A magnetic transducer for generating a magnetic induction field within a magnetic medium of a degraded type having a magnetically unsaturated portion comprising means connected to a datum point on the medium for generating a selection wave to be propagated along at least one given path of said medium, starting from said given datum point and from a reference instant $t_R$ and reaching each point along the said path at an instant the selection wave and an energizing field acting simultaneously at the instant $t_i$ on an area surrounding each point of the said path cause the magnetic properties of said area to be modified and means for generating said magnetic energizing field at least partially along said path such that the selection wave and the energizing field act simultaneously at the instant $t_i$ on the said area so as to cause the said induction field to be generated with the magnetic medium.

5. A transducer according to claim 4, wherein the magnetic medium is of the magnetostrictive type, and the selection wave creates in the said area, at the instant $t_i$, a mechanical stress which for its part produces the magnetic selection field.

6. A transducer according to claims 4 or 5, wherein the means for generating the selection wave is an acoustical generator.

7. A transducer according to claims 4 or 5, wherein said selection wave is a sound wave.

8. A system for generating a magnetic induction field within a magnetic medium of a degraded type having a magnetically unsaturated portion comprising means connected to a datum point in the medium for generating a selection wave to be propagated along at least one given path of said medium, starting from said given datum point and from a reference instant $t_R$, and reaching each point along the said path at an instant the selection wave and an energizing field acting simultaneously at the instant $t_i$ on an area surrounding each point of the said path cause the magnetic properties of said area to be modified, and means for generating said magnetic energizing field at least partially along said path such that the selection wave and the energizing field act simultaneously at the instant $t_i$ on the said area so as to cause the said induction field to be generated within the magnetic medium, means for controlling the means of generating the selection wave, means for controlling the means of generating the energizing field, and a recording carrier situated closely adjacent to and in front of the said medium in such manner that the recording is made along a direction parallel to said path.

9. A system for generating a magnetic field according to claim 8, wherein the means for generating the selection wave comprises an acoustical transducer for generating an acoustic wave.

10. A system for generating a magnetic field according to claim 8, wherein the means for generating the energizing field comprises an electromagnet of integrated type comprising two thin magnetically coupled magnetic layers, and at least one conductor separated from each of the magnetic layers by at least one electrically insulating layer.

11. A system for generating a magnetic field according to claim 8, wherein the magnetic medium is of the magnetorestrictive type, the selection wave creating in the said area, at the instant $t_i$, a mechanical stress which for its part produces a magnetic selection field.

12. A system according to claim 11, wherein said selection wave is a sound wave.

13. A process according to claim 1, wherein the step of modifying the magnetic properties results in contraction of the of the hysteresis cycle of said area of the magnetic medium and a decrease of its magnetic permeability.

* * * * *